March 17, 1931.  V. G. APPLE  1,796,422
DYNAMO ELECTRIC MACHINE ELEMENT
Filed June 14, 1928
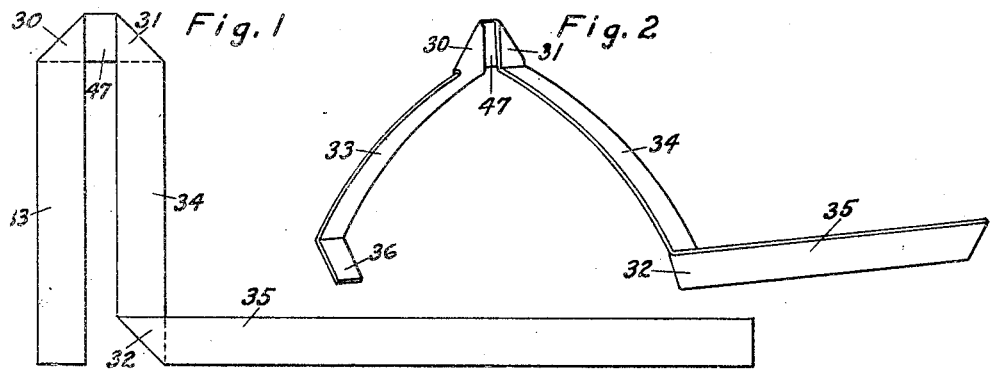
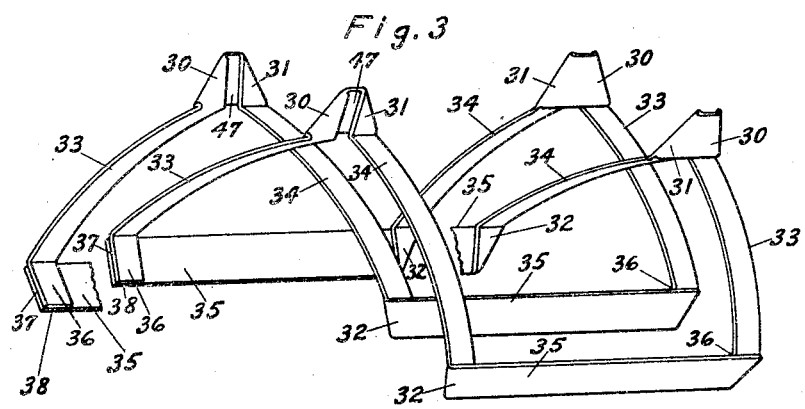
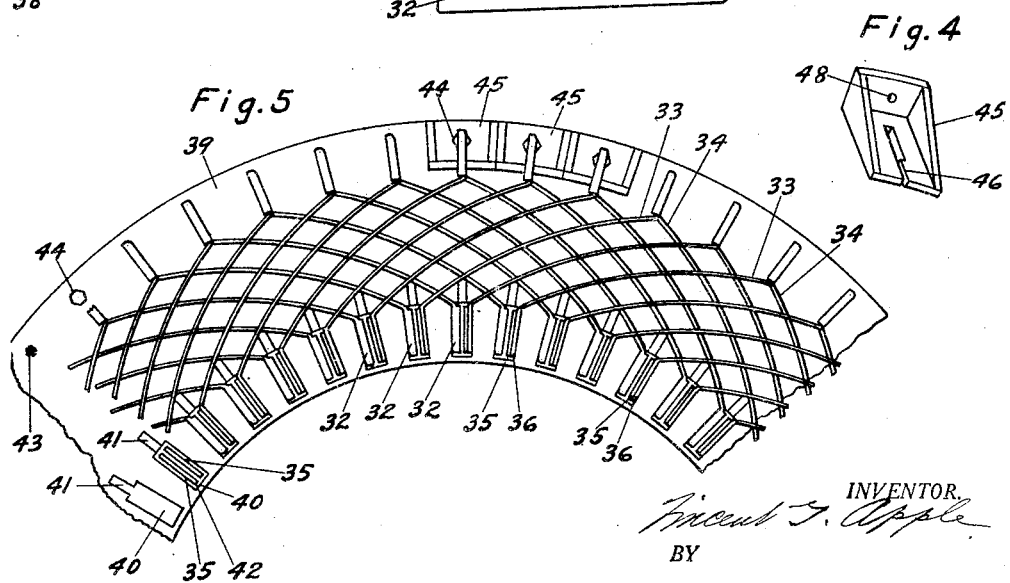
INVENTOR.
Vincent G. Apple
BY
ATTORNEYS.

Patented Mar. 17, 1931

1,796,422

UNITED STATES PATENT OFFICE

VINCENT G. APPLE, OF DAYTON, OHIO

DYNAMO-ELECTRIC-MACHINE ELEMENT

Application filed June 14, 1928. Serial No. 285,380.

My invention relates to improvements in dynamo electric machine elements wherein the winding is composed of a plurality of conducting bars assembled about a core and joined to compose one or more continuous circuits.

One of the objects of my invention is to so form the conducting bars of the winding, prior to their entry in the core slots, that no further forming or bending of the bars is required to complete the turns of the winding circuit, after said bars are entered into said slots.

Another object of my invention is to so form the winding bars, that the connections which must be made to complete the turns are readily accessible, so that they may conveniently be brazed, welded or otherwise joined.

Further objects will be apparent, to those skilled in the art, as the invention is described in detail and reference is made to the drawings wherein—

Figs. 1 and 2 show steps in the process of forming bars for my winding suitable where economy in end room is an object.

Fig. 3 shows several bars which have been formed as shown in Fig. 2, then joined together.

Fig. 4 is a clamp, a number of which are employed to hold the end turns of the winding in place on the core.

Fig. 5 shows a portion of an element wound with bars formed as in Fig. 2.

Similar numerals refer to similar parts thruout the several views.

In wound structures, of the class to which my invention is applicable, spaced about bars are connected by end connecting portions or leads to compose winding turns, the leads being in some cases integral parts of the bars, and in other cases separately formed and joined thereto.

When separate end connectors are employed there are four joints to be made for each turn of the winding, and unless a separate core slot is provided for each bar, it is often difficult to make the joints of one layer because they are obstructed by the bars of the other layer.

End connectors are sometimes formed integral with the bars by appropriately bending the bars at both ends, and bars so bent may be radially entered in open core slots, but since closed or partially closed slots are greatly to be preferred, for reasons well known in the art, the bars are sometimes first bent at one end, then endwise entered thru closed or partially closed slots, then afterward bent at the ends which project thru and beyond the slots. By this process but two joints are required to be made for each turn of the winding but considerable difficulty may be encountered, especially in relatively large units, in bending the ends which project thru and beyond the core after they are so assembled with the core.

A novel and serviceable feature of my present invention resides in the form of bar, which permits of endwise entry into the core slots, half of the bars from each end of the core, and joining the bars to compose turns without bending the bars after they are entered, the open ends being so positioned as to be readily accessible for making the joints.

When the end space available is limited, in a dynamo electric machine element, involute end connectors are usually employed to connect the bars of the winding, and in Figs. 1 to 5 inclusive, I show an embodiment of my invention which employs this form of connector.

Usually when two conducting bars are contained in the same core slot, the one bar is placed radially above the other in the slot, but in the present case, in order that the bars may be of relatively thin and wide cross section, the two bars of a slot are placed circumferentially adjacent. In Fig. 1 I show how a length of strip stock may be folded at 30, 31 and 32 to provide leads 33 and 34 integral with a conducting bar 35.

Fig. 2 shows how the bar Fig. 1 may be further formed to compose a complete unit of the winding, an end 36 being suitably bent and spaced apart from bar 35 to be adapted for connection to a bar of a similar unit. When a sufficient number of units (Fig. 2) have been provided they are assembled in cylindrical formation, one to each core slot at one end of a core, and one to each core slot at the other end of the core, then simultaneously endwise entered thru the core slots, half from each end, or, the one half may be first entered from one end of the core, then the other half from the other end of the core.

When closed or semi-closed core slots are employed, no joints connecting the winding units may be made prior to entry in the core slots, but, for clearness of illustration, in Fig. 3 I show several units of the winding, assembled as they may be when in a core.

In a complete winding, wherein involute end connectors are employed, the leads arrange themselves in layers, two layers at each end of the core, one layer at each end being next to the end of the core and the other layers covering the first mentioned layers. It is therefore apparent that if joints must be made to complete such a winding it is preferable that they be in the outer layers of the leads, since in this position they are most accessible.

By reference to Fig. 3 it is readily apparent that wherever a bent end 36 must be joined to the free end of a bar 35 it occurs in the outer layer of leads, and two edges as at 37 and 38 are conveniently accessible when welding or similar means is employed to make the joints.

In Fig. 5 I show a portion of an end view of a complete unit employing a winding composed of bars as shown in Fig. 2. A core 39 contains winding slots 40, 40, etc., each slot having a narrower outwardly extending portion 41 into which the winding does not extend, thus providing for endwise ventilation thru the core. Radial ventilation may also be provided by spacing apart the laminæ of the core at intervals as is customary in relatively large units. Each slot contains two bars placed circumferentially adjacent as at 35 and 35 the remaining portion being taken by insulation material 42 as shown.

Tapped holes 43 are provided at intervals corresponding to the number of slots into which screws 44 may extend to hold winding braces 45, several only of which are shown in place. A winding brace 45 is shown in detail in Fig. 4. It is composed of insulating material and carries a tongue or key 46 which enters the channel 47 formed by the folds 30 and 31 of the winding units. One brace 45 is provided for each unit of the winding, half being at each end of the core. Screws 44 extend thru holes 48 to hold the braces in position.

Since the folds 32 are relatively close to the end of the core it follows that there is considerable space from slot to slot between pairs, composed of ends 35 and 36 which must be joined, since they are relatively farther from the end of the core, so that while the method of joining by welding the edges at 37 and 38, as indicated relative to Fig. 3, may be preferred, the joints may be made by other means such as flatwise spot welding the two together, or bolts may be used to connect the two layers, since there is sufficient room for the heads of such bolts and the required nuts.

I claim—

1. In the winding of a dynamo electric machine element having involute end connectors arranged in two axially adjacent layers, an integral unit of said winding comprising, a single conductor bar having an involute end connector of the inner layer and an involute end connector of the outer layer, both at one and the same end of said bar.

2. In a winding of a dynamo electric machine element having involute end connectors arranged in two axially adjacent layers at each end of the core, an integral unit of said winding comprising in the following order, first a conductor bar, next an involute end connector of the inner layer, then an involute end connector of the outer layer.

3. In the winding of a dynamo electric machine element having involute end connectors arranged in two axially adjacent layers, an integral unit of said winding comprising, a single straight conductor bar folded at one end to compose an involute end connector of the inner layer and an involute end connector of the outer layer.

In testimony whereof I hereunto sign my name.

VINCENT G. APPLE.